(12) United States Patent
Zacchè et al.

(10) Patent No.: US 9,039,405 B2
(45) Date of Patent: May 26, 2015

(54) SYSTEMS FOR SPACING AND TRANSFERRING OBJECTS BETWEEN OPERATIVE STATIONS

(71) Applicant: SMI S.p.A., Bergamo (IT)

(72) Inventors: Vanni Zacchè, Bergamo (IT); Giorgio Salvi, Bergamo (IT); Marco Grazioli, Bergamo (IT)

(73) Assignee: SMI S.p.A., Bergamo (IT)

( * ) Notice: Subject to any disclaimer, the term of this patent is extended or adjusted under 35 U.S.C. 154(b) by 79 days.

(21) Appl. No.: 13/911,101

(22) Filed: Jun. 6, 2013

(65) Prior Publication Data

US 2013/0330437 A1    Dec. 12, 2013

(30) Foreign Application Priority Data

Jun. 7, 2012   (IT) .............................. MI2012A0991

(51) Int. Cl.
| | |
|---|---|
| *B29C 49/68* | (2006.01) |
| *B65G 47/30* | (2006.01) |
| *B29C 49/42* | (2006.01) |
| *F27D 3/00* | (2006.01) |
| *B29C 49/06* | (2006.01) |

(52) U.S. Cl.
CPC ............ *B65G 47/30* (2013.01); *B29C 49/4205* (2013.01); *B29C 49/4215* (2013.01); *F27D 3/00* (2013.01); *B29C 49/06* (2013.01)

(58) Field of Classification Search
CPC ..... B29C 49/68; B29C 49/4215; B65G 47/30
USPC ......... 425/526, 534; 198/459.1, 459.4, 468.3, 198/470.1, 474.1; 414/158
See application file for complete search history.

(56) References Cited

U.S. PATENT DOCUMENTS

| | | | |
|---|---|---|---|
| 3,565,235 A * | 2/1971 | Brown et al. ............... | 198/459.4 |
| 4,511,027 A | 4/1985 | Zamboni | |
| 4,753,275 A * | 6/1988 | Schaltegger ...................... | 141/1 |
| 6,152,723 A | 11/2000 | Winter et al. | |
| 2011/0151047 A1* | 6/2011 | Borgatti et al. ............... | 425/526 |

FOREIGN PATENT DOCUMENTS

DE    102008037865    2/2010

* cited by examiner

*Primary Examiner* — Robert B Davis
(74) *Attorney, Agent, or Firm* — Robert E. Alderson, Jr.

(57) ABSTRACT

Systems for spacing and transferring objects between operative stations are provided. Such systems can be used with ovens for preforms for plastic material, in blowing or stretch-blowing machines and for other applications in the packaging field. Such systems provide spacing and transferring of objects advancing in procession on transport elements, from a minimum pitch to a preset pitch larger than said minimum pitch, and for transferring said spaced objects to handling elements.

32 Claims, 10 Drawing Sheets

SYSTEMS FOR SPACING AND TRANSFERRING OBJECTS BETWEEN OPERATIVE STATIONS

CROSS REFERENCE TO RELATED APPLICATION

This application claims priority to and benefit of Italian Patent Application No. MI2012A000991 filed Jun. 7, 2012, the contents of which are incorporated by reference in their entirety.

FIELD OF THE INVENTION

The present invention relates to systems for spacing and transferring objects between operative stations. In particular, the invention may be applied to ovens for preforms in plastic material, usable moreover, without limitation, in blowing or stretch-blowing machines.

BACKGROUND OF THE INVENTION

Obtaining containers by the blowing of special preforms suitably heated within a mould having a desired shape is a widely used technique in the packaging field, in particular for manufacturing bottles for beverages.

There are substantially two different techniques, simple blowing and stretch-blowing, providing for the pneumatic blowing and the concomitant mechanical stretching of the preform in the mould. In both cases, the preforms have to reach the blowing or stretch-blowing machine in a thermal condition corresponding to the softening point of the material, so as to be able to be plastically deformed within the moulds.

Softening of preforms is carried out in special ovens, which include a series of heating modules arranged in series along the path of the preforms.

In order to maximize both the thermal efficiency and the dimensions of the oven, it is desired that the preforms are introduced and made to slide within the oven as close as possible to one another.

However, this need is in contrast to the need that the heated preforms are suitably spaced for their insertion into the moulds of the blowing or stretch-blowing machine, the pitch of which, due to obvious dimensioning reasons, cannot be reduced beyond a given limit.

In conventional machines, spacing the preforms to the pitch of the moulds is carried out by handling elements, in particular distribution stars, comprising a plurality of preform gripping elements that are arranged at the same pitch of the moulds in the blowing machine or at an intermediate between the pitch of the latter and the pitch of the preforms exiting the oven. Therefore, the distribution stars are arranged in rotation at a speed greater than the feeding speed of the heated preforms, and less than or equal to the rotation speed of the blowing machine.

This speed change imposes considerable acceleration to the preforms. When considering that preforms, when they exit the oven, are not rigid, but softened, such acceleration may cause deformation, with a consequent formation of imperfections in bottles obtained after blowing or stretch-blowing operations. In fact, deformed preforms may contact the mould surface before starting the blowing or stretch-blowing process, causing an abrupt cooling of the preform at the contact point, which thus prevents it from expanding.

It also should be noticed that the diameter of the distribution stars and/or the pitch of the gripping elements located thereon is not fixed, depending on the type of the machine. This fact further increases problems related to transfer of the softened preforms from the oven to the distribution stars, which transfer cannot be performed in homokinetic conditions. When the distribution star diameter is lower and is thus spaced apart from the release elements of the preforms from the oven, the preforms will be subjected to a two-component acceleration: a tangential component for the spacing thereof at the pitch of the star, and a radial component during the transferring step from the oven to the star. This combined acceleration is particularly detrimental, often causing deformation of the preforms.

SUMMARY OF THE INVENTION

The present invention provides systems for spacing and transferring of objects, in particular preforms, which overcome the above-mentioned drawbacks.

Such problems are solved by systems for spacing and transferring objects as described herein.

DETAILED DESCRIPTION

The following description relates to specific embodiments of systems for spacing and transferring objects according to the invention, i.e., the application of systems to an oven for softening preforms to be sent to a blowing machine. However, it should be understood that systems described herein may be applicable to other equipment where it is necessary to change the pitch of objects in a predetermined path, particularly in packaging industries.

With reference to the Figures, ovens for preforms according to embodiments of the invention are indicated with the number 1, which ovens may be operatively connected with handling elements 2, 3 of the preforms, entering and exiting the ovens 1, respectively.

Such handling elements 2, 3 may include distribution stars which may have a series of gripping elements 4, for example, notches or recesses, adapted to engage preforms, for example, at the neck.

The handling elements 3 for preforms exiting the oven 1 may be in turn operatively connected to a blowing machine 5 (the term "blowing machine" as used in the present description refers to any type of blowing or stretch-blowing machine) which may include a plurality of moulds 6 in which the heated preform is inserted and from which it comes out in the shape of a blow-molded bottle (or stretch-blown) bottle.

The blowing machine 5 may be in turn operatively connected to distribution elements 7, such as a distribution star, adapted for drawing the blow moulded bottles exiting the blowing machine and for transferring them, by a suitable transport system, to the next operative unit. For this purpose, the distribution star 7 may include a plurality of notches 4' adapted to engage the neck of blow moulded bottles.

Figure 1:
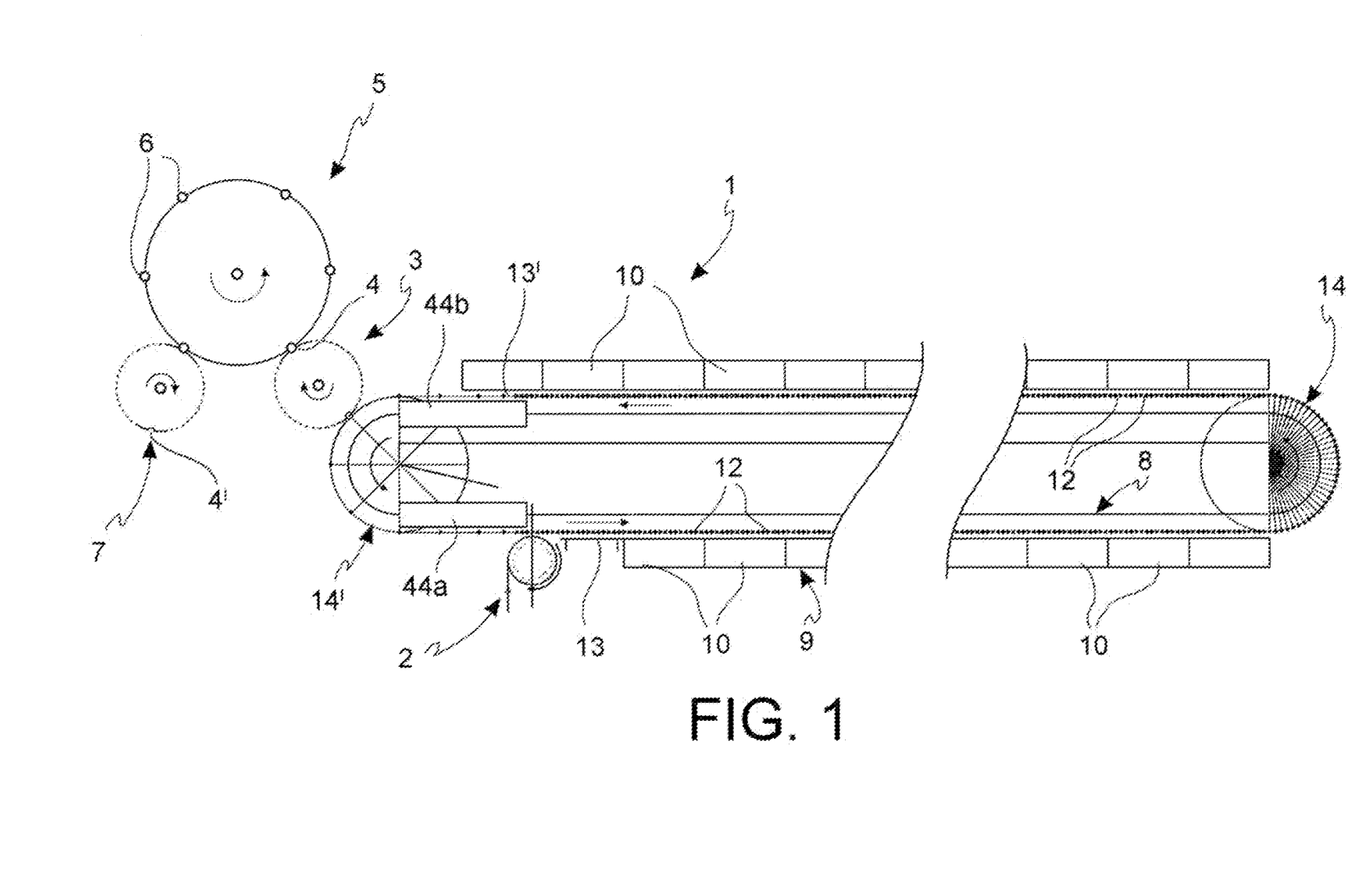
FIG. 1 represents a plan schematic view of an oven-blowing machine assembly according to an embodiment of the invention.

A path of the preforms may be thus defined, as indicated in FIG. 1 by the directions of the arrows, from their supply to the oven 1 to the entering of the moulds 6 of the blowing machine 5.

The oven 1 may include transport elements 8, adapted for handling the preforms along a path inside the oven, and heating elements 9.

Heating elements 9 may include a plurality of heating modules 10 aligned along a preform path, typically outside the transport elements 8. Such heating modules 10 may include, for example, one or more infrared lamps and suitable reflective surfaces to optimize the lamp efficiency.

The transport elements 8 may include a track 11 on which a plurality of mandrels 12 runs, each being adapted to engage a preform. The track 11 may include two substantially parallel rectilinear lengths 13, 13' and two curvilinear lengths 14, 14', connecting at the two ends the rectilinear lengths 13, 13' according to an arc-of-circle-shaped path. Corresponding driving wheels 15, 15' may be arranged at said curvilinear lengths 14, 14', as described in more detail below.

The track 11 may include a pair of rails 16a, 16b arranged one above the other, each in turn divided into rectilinear lengths and curvilinear lengths at the rectilinear and curvilinear lengths 13, 13', 14, 14' of track 11.

The rails 16a, 16b may have an L-shaped profile in section, which may include a rack bar 17a, 17b forming a side of the L, and a guide bar 18a, 18b forming the other side of the L. In track 11, the rack bars 17a, 17b of the rails 16a, 16b may be facing, while the corresponding guide bars 18a, 18b may extend in opposite directions on a same vertical plane.

The rack bars 17a, 17b may include, on the rectilinear lengths 13, 13' of the track 11, a double rack profile 19 separated by a groove 20, while a single rack may be present on the curvilinear lengths 14, 14'. Such single rack may be made of an elastically deformable material, such as, for example, polyurethane.

The guide bars 18a, 18b may have a wedge profile 21 at their top.

The first driving wheel 15 may be arranged in a distal position to the feeding point of the preforms in the oven 1, while the second driving wheel 15' may be arranged at the release point of the heated preforms from the oven and in a position proximal to the feeding point of the preforms into the oven.

Each driving wheels 15, 15' may include two pairs of discs.

The first driving wheel 15 may include a pair of lower discs 22a and a pair of upper discs 22b, arranged respectively in an lower and an upper position with respect to the rails 16a, 16b and within the curvilinear length 14 of the track 11. The two pairs of lower and upper discs 22a, 22b may be associated with the same vertical shaft 23, which may be freely rotatable on a suitable support (not shown).

The pair of lower discs 22a may include first and second discs 24, 24', the second disc 24' being spaced apart above the first disc 24, by suitable spacers 25, and having a diameter lower than that of the first disc 24.

Both the first and the second discs 24, 24' of the pair of lower discs 22a may include, along the perimeter thereof, a plurality of semicircular recesses 26 arranged in sequence, so that the recesses 26 of the first disc 24 may be radially aligned with the recesses 26 of the second disc 24'.

The pair of upper discs 22b may include first and second discs 24'', 24''', the second disc 24''' being spaced apart above the first disc 24'', by suitable spacers 25, and having a diameter larger than that of the first disc 24''. In particular, the second disc 24''' of the pair of upper discs 22b may have the same diameter of the first disc 24 of the pair of lower discs 22a, while the first disc 24'' of the pair of upper discs 22b may have the same diameter of the second disc 24' of the pair of lower discs 22a.

Both the first and the second disc 24'', 24''' of the pair of upper discs 22b may include, along the perimeter thereof, a plurality of semicircular recesses 26 arranged in sequence, so that the recesses 26 of the first disc 24'' are radially aligned with the recesses 26 of the second disc 24''' and with the recesses 26 of both the first and the second discs 24, 24' of the pair of lower discs 22a.

Similarly, the second driving wheel 15' may include a pair of lower discs 27a and a pair of upper discs 27b, arranged in the lower and upper position, respectively, with respect to the rails 16a, 16b and within the curvilinear length 14' of the track 11. The lower 27a and upper 27 pairs of discs of the second driving wheel 15' may be like those of the first driving wheel 15 described above, except that the semicircular recesses 26 may be arranged at an angular distance one to the other that corresponds to the pitch of the notches 4 of the distribution star 3 for the heated preforms.

Each of the mandrels 12 may include a housing 28 integrally associated with a sliding support 29.

The sliding support 29 may include a fork bar 30 with a C profile, astride the track 11. Said fork bar 30 may include a vertical plate 30a, from the two ends of which, two arms 30b, 30c extend. Two toothed wheels 31, 31' may be rotatably associated with the vertical plate 30a, which may be arranged along a vertical axis between the rack bars 17a, 17b of the rails 16a, 16b, so as to mesh with one another and with the racks 19 of the corresponding bars. Each of the toothed wheels 31, 31' may include two coaxial toothed pinions, arranged so as to mesh together and with the double racks 19 that may be present on the rectilinear lengths of the rails. Vice versa, at the curvilinear lengths, in certain embodiments only the outermost toothed pinion meshes with the single rack (see FIG. 3).

Furthermore, two cylindrical bearings 32a, 32b may be rotatably mounted on the vertical plate 30a, at the arms 30b, 30c. Said bearings 32a, 32b may include a groove 33 arranged along the cylindrical surface thereof, adapted to engage in rotation with corresponding guide bars 18a, 18b.

The arms 30b, 30c may include guide elements for the mandrel 12, that are adapted to engage with the recesses 26 of the discs 24, 24', 24'', 24''' of the driving wheels 15, 15'.

Such guide elements may include a first pair of guide rollers 34 rotatably mounted in the proximity of the distal end of the arms 30b, 30c, and arranged so as to face one another. This first pair of guide rollers 34 can be configured to interfere with the recesses 26 of the second disc 24' of the pair of lower discs 22a, 27a and with the first disc 24" of the pair of upper discs 22b, 27b of the driving wheels 15, 15'.

The guide elements may further include a second pair of guide rollers 35 rotatably mounted on opposite faces of the arms 30b, 30c, in proximity to the connection point between the arms 30b, 30c and the vertical plate 30a. The second pair of guide rollers 35 may be configured to interfere with the recesses 26 of the first disc 24 of the pair of lower discs 22a, 27a and with the second disc 24''' of the pair of upper discs 22b, 27b of the driving wheels 15, 15'.

Coaxial to the guide roller 35 arranged on the upper arm 30b, a pushing roller 36 may be rotatably mounted. The function of such pushing roller 36 is described in more detail below.

Figure 3:
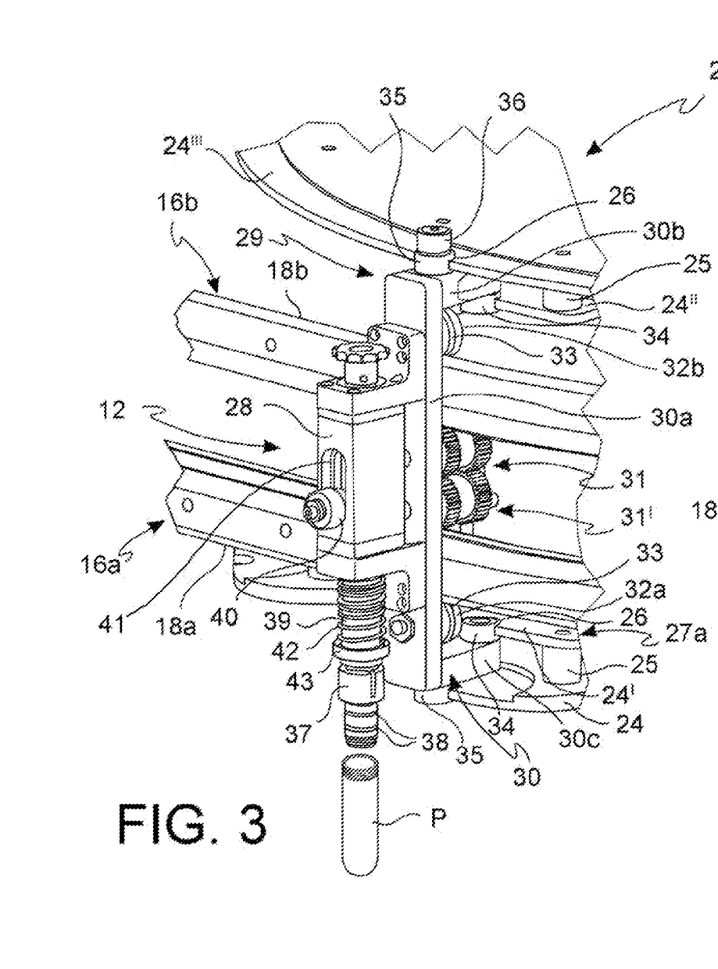
FIG. 3 represents a detailed perspective view showing a mandrel of the system of FIG. 2.
Figure 4:
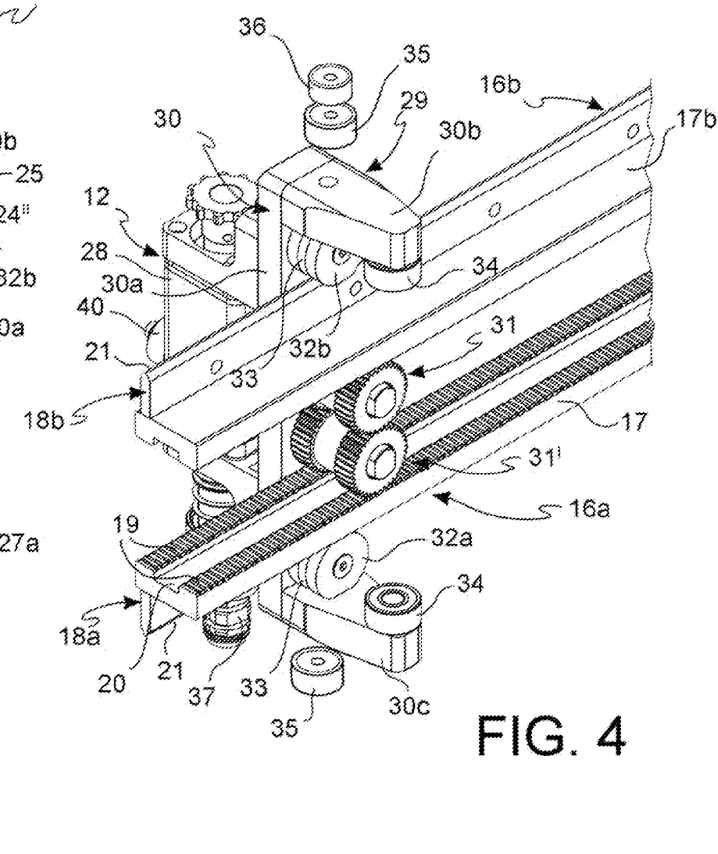
FIG. 4 represents a different detailed perspective view showing the mandrel of FIG. 3 in a different operative position.
Figure 5:
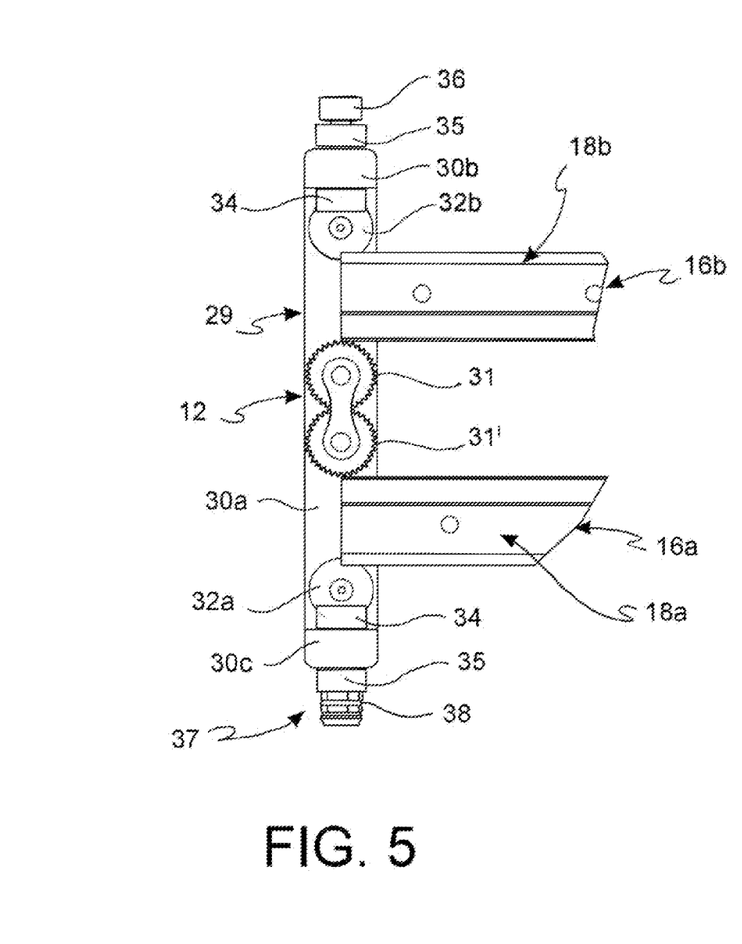
FIG. 5 represents a side view according to the direction A of FIG. 4.
Figure 6:
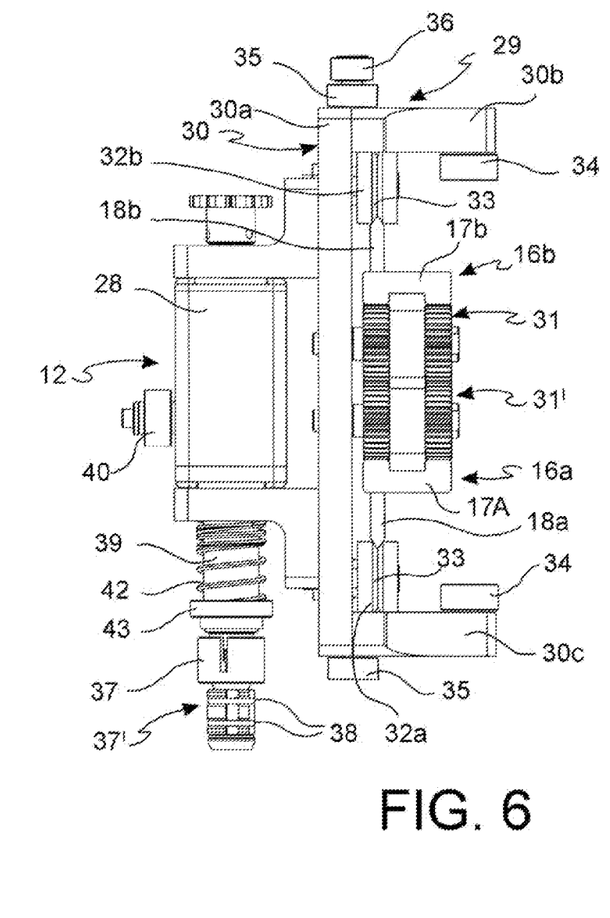
FIG. 6 represents a side view according to the direction B of FIG. 4.

The housing 28 of the mandrel 12 may house a gripping finger 37 for a preform P (shown in FIG. 3). The gripping finger 37 may have a diameter slightly lesser than the inner diameter of the preform P and may include, on the distal portion of the outer surface thereof, an engaging portion 37' which may include in turn one or more annular reliefs 38 promoting the engagement with the inner neck of the preform. For example, such reliefs 38 may be made of an elastic material, such as an elastomer, or they may include elastic sections that are able to reenter or to radially expand with respect to the cylindrical surface of the gripping finger 37, exerting a holding pressure on the preform inner surface.

The gripping finger 37 may further include a stem 39 that is inserted in the housing 28 and that is vertically mobile. A driven member 40 may be associated with the stem 39, which externally protrudes from the housing 28 through a slot 41 arranged vertically on the housing 28 body. Such driven member 40 typically includes a roller adapted to interact with a cam profile (not shown), which allows lifting or lowering the gripping finger 37, so as to disengage or engage, respectively, the inside of the preform P neck.

A coil spring 42 may be arranged on the stem 39 and may abut against a shoulder 43 in the proximity of the engaging portion 37' of the gripping finger 37. Such spring 42 promotes the elastic return downwardly of the gripping finger 37.

The transport elements 8 of the oven 1 may further include handling and spacing system of the mandrels 12. Such handling and spacing system may include a first screw 44a arranged at the feeding point of the preforms in the oven, between the driving wheel 15' and a first rectilinear length 13 of the track 11; and a second screw 44b arranged at the junction point between the second rectilinear length 13' of the track 11 and the same driving wheel 15'.

Both screws 44a, 44b may include a spiral slot 45 having a variable pitch to interfere with the pushing roller 36 of each mandrel 12. The screws 44a, 44b may be mounted in an inverted position along the running direction of the mandrels 12, so that the first screw 44a has a larger pitch upstream along the running direction, while the second screw 44b has a larger pitch downstream.

The screws 44a, 44b may be moved independently, but in a synchronized manner, by corresponding motors (not shown), or by a single motor provided with mechanical transmission.

The second driving wheel 15', which, as stated, may have a structure similar to the first driving wheel 15, may further include a plurality of pliers 50 adapted for engaging the neck of the preforms P exiting the oven and for transferring them to the handling elements 3.

The pliers 50 may be arranged below the driving wheel 15' and may be mounted on slide elements 51 that allow the plier 50 to extend radially with respect to the driving wheel 15'.

The slide elements 51 may include a sliding portion 52 and a support portion 53.

The sliding portion 52 may include a closed C-shaped profile member 52' adapted to slide along a suitable guide, as described in more detail below.

The support portion 53 may include a partitioning element 53a protruding downwardly and at the lower end of which a base plate 53b may be secured. On the lower face of the base plate, a first driven member 54 may be arranged, typically a driven roller or double driven roller freely rotatable with a vertical rotational axis.

Figure 7A:
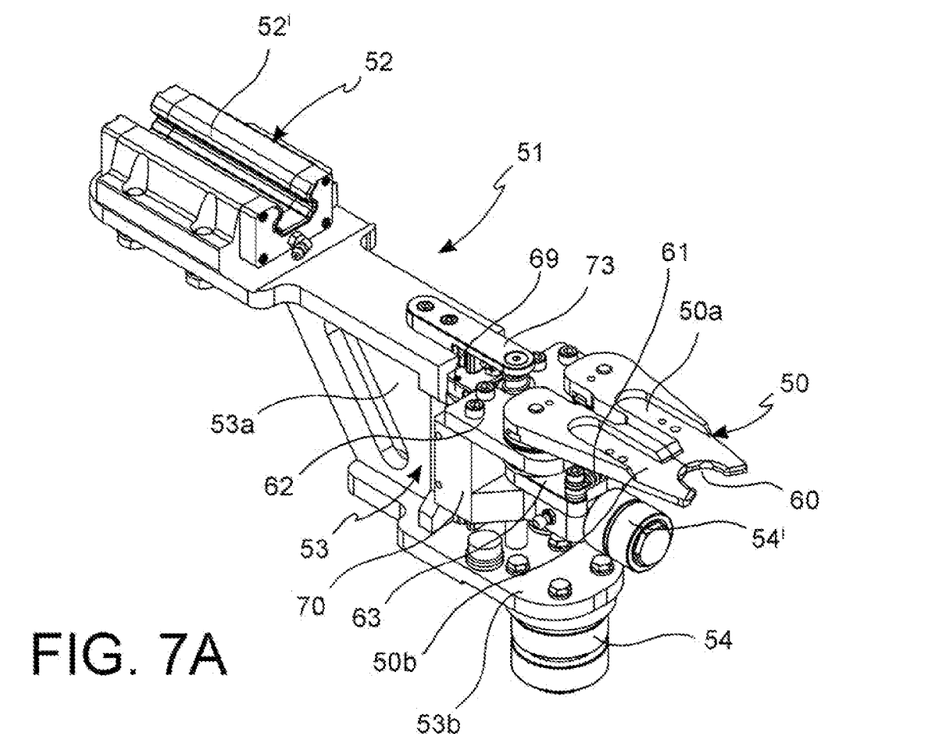
FIG. 7A shows a perspective view of a plier of the system for spacing and transferring objects of the invention.
Figure 7B:
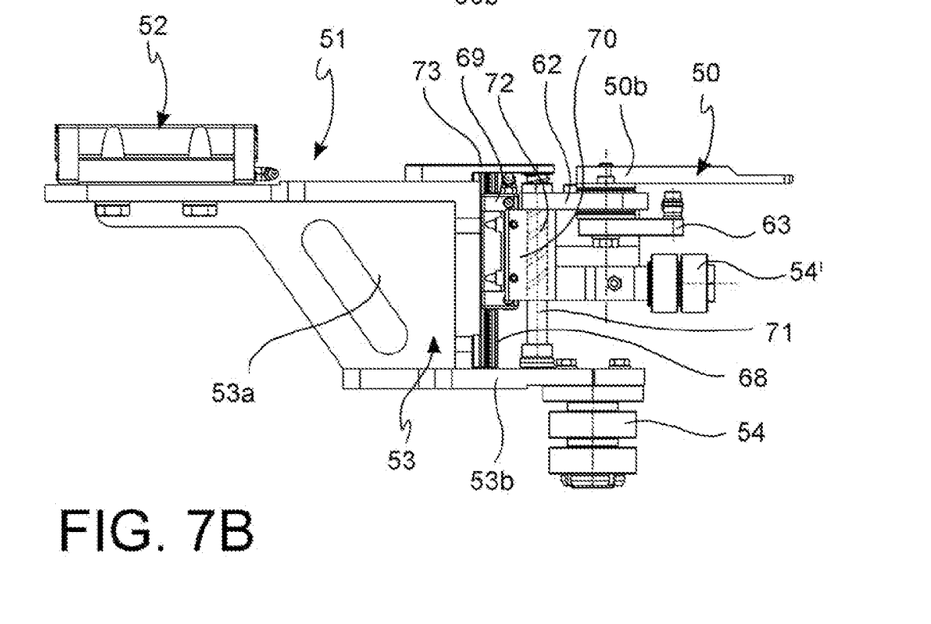
FIG. 7B shows a side view of the plier of FIG. 7A.

Furthermore, the support portion 53 may house the opening-closing mechanism of the plier 50, which may include two jaws 50a, 50b coupled so as to define a recess 60 for the object to be handled, such as a preform. The jaws 50a, 50b may be hinged above a small plate 62 and may include, below such small plate 62, corresponding small tabs 63 (in the drawing, only one relating to the jaw 50b is shown) connected by elastic element 61, such as a spiral spring. The opening of the jaws 50a, 50b may be opposed by said elastic element 61, so that the jaws 50a, 50b, when they are in contact with and are subjected to the pressure of the preform neck, spread apart sufficiently to receive the preform P in the recess 60, and to subsequently snap close. The transferring of the preform from the plier 50 to the handling elements 3 occurs in the same manner, but in an inverse direction.

The small plate 62 may be secured on a housing 70, which, in turn may include a sliding member 69 associated with a vertical guide 68 secured to the front surface of the partitioning element 53a.

The housing 70 may have a hole in which a vertical support shaft 71 is inserted. The support shaft 71 may be held between the base plate 53b at the bottom and a holding plate 73 at the top.

Around the support shaft 71, compression elastic elements 72 may be located, such as a spiral spring, abutting inferiorly against an internal shoulder of the housing 70 and superiorly on the holding plate 73. In this manner, the plier 50 may slide in the vertical direction between the base plate 53b and the holding plate 73. When the plier 50 is in the raised position, the elastic elements 72 are loaded.

On the housing 70, a second driven member 54' also may be secured, typically a driven roller or a double driven roller freely rotatable with horizontal rotational axis, protruding outwardly from the plier 50 in the longitudinal direction.

Figure 8:
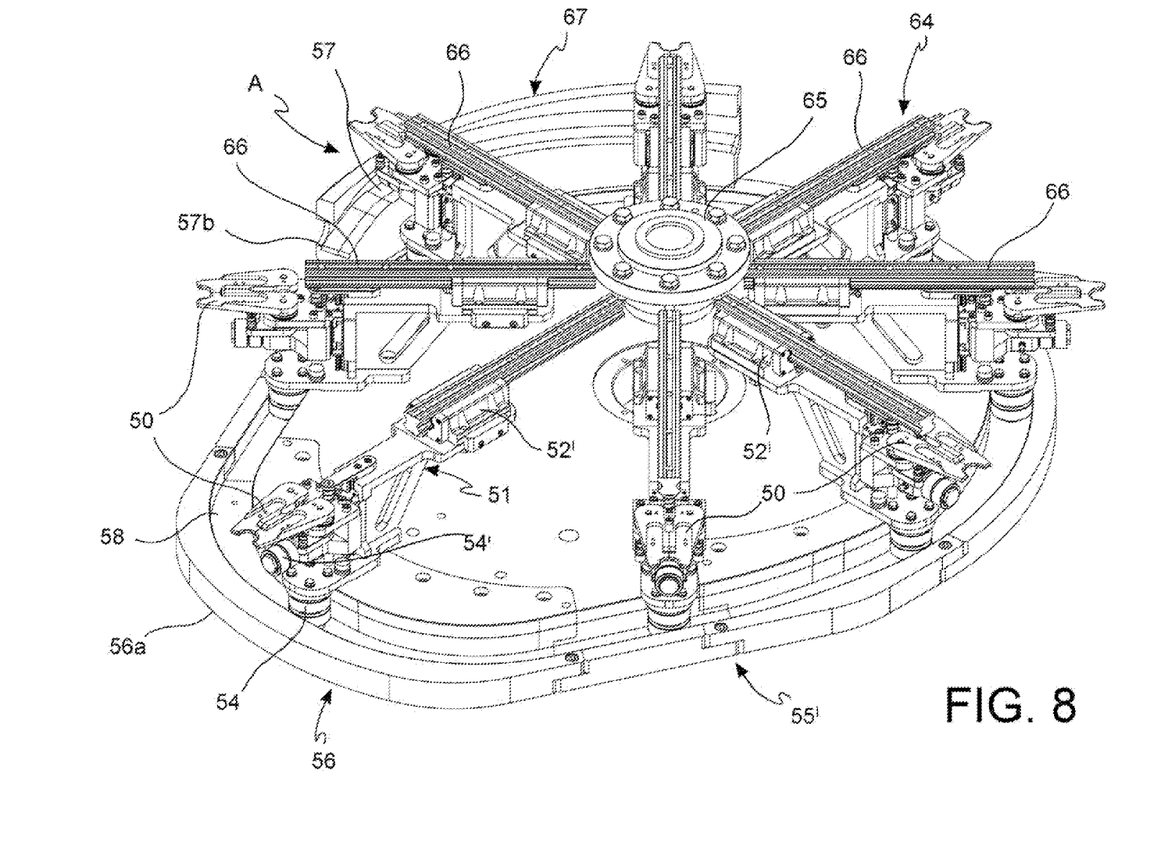
FIG. 8 shows a perspective view of the pliers support according to an embodiment of the invention.

FIG. 8 shows the assembly of the pliers 50 mounted on a guide structure 64.

The guide structure 64 may include a hub 65, adapted for mounting below the driving wheel 15' so as to rotate integrally thereto, from which a plurality of guide bars 66 extends radially, on which the closed C-shaped profile members 52' of the pliers 50 may be slidably mounted. The pliers 50 thus may be located at a distance that corresponds to the pitch of the gripping elements 4 of the handling elements 3.

The support structure (not shown) of the system for spacing and transferring objects may support a first cam profile 55, 55'. The first cam profile 55, 55' may be located in a fixed, yet removable, manner below the second driving wheel 15', at the corresponding curvilinear length 14' of the track 11. The cam profile 55, 55' may be adapted to cooperate with the first driven member 54 of the pliers 50, determining the path thereof.

The cam profile 55, 55' may include a curvilinear path 58 running at a lower level than the level where the first driven member 54 is located at the gripping point A of the preform P by the plier 50.

A second cam profile 67 may be located at the gripping point A of the preform by the plier 50, and is adapted for cooperating with the second driven member 54' of the plier 50. The second cam profile 67 may include an initial raised length 57a and a terminal lowered length 57b, so as to lower the plier 50 to such a level that the first driven member 54 cooperates with the curvilinear path 58 of the first cam profile 55, 55'. Such movement of the plier 50 is allowed by the sliding along the vertical guide 68. In this manner, the plier 50, once it couples the preform P, lowers, thus allowing the disengagement of the preform from the gripping finger 37 of the mandrel 12.

The cam profile 55, 55' as stated may be removable, so as to be interchangeable according to the various needs.

Figure 2:
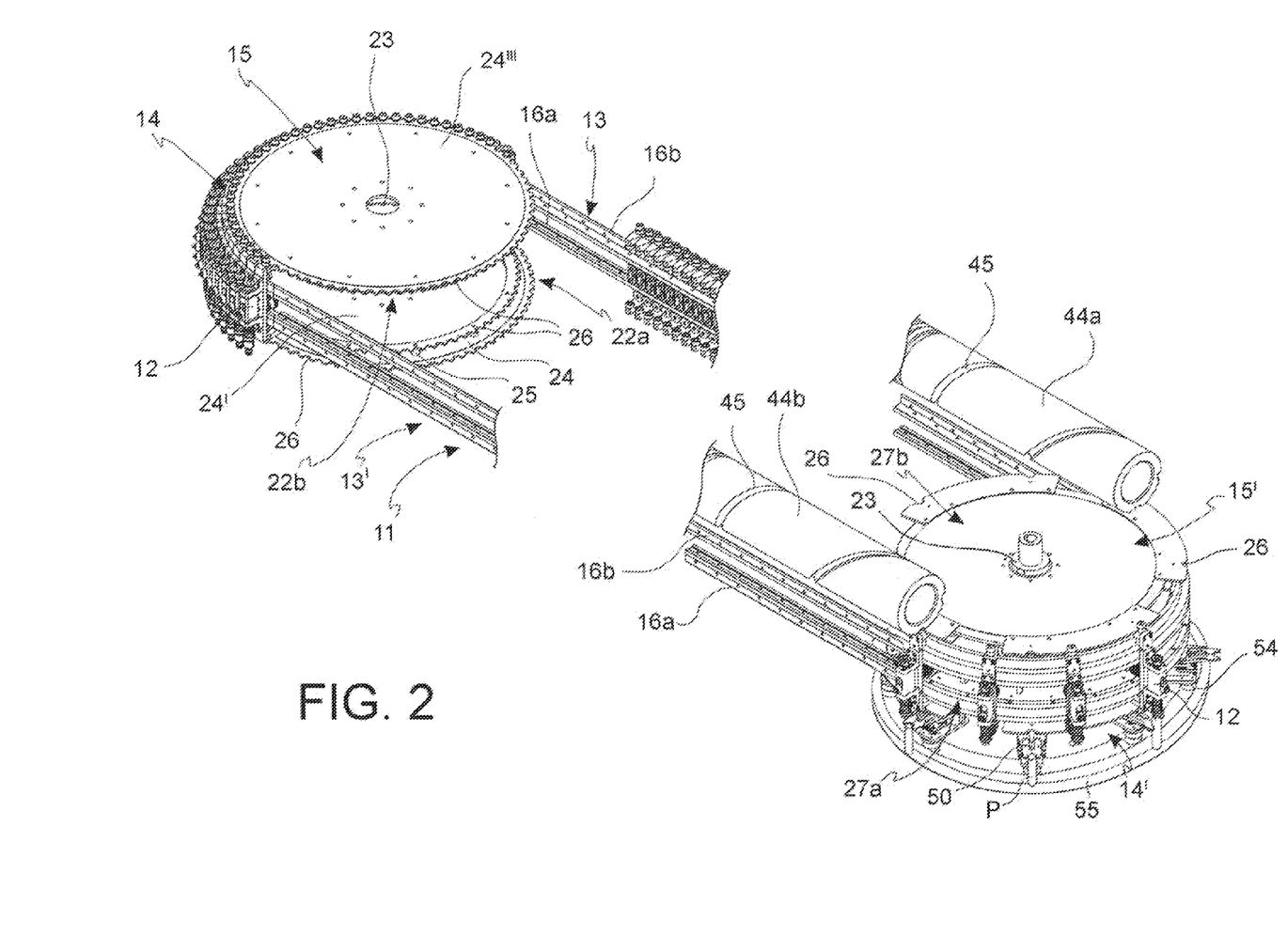
FIG. 2 represents a perspective partial view of the system for spacing and transferring objects according to an embodiment of the invention.

As shown in FIG. 2, the cam profile 55 may describe an arc of a circle with the same radius of curvature of the driving wheel 15', whereby the pliers 50 may follow the same path of the mandrels 12.

Figure 2A:
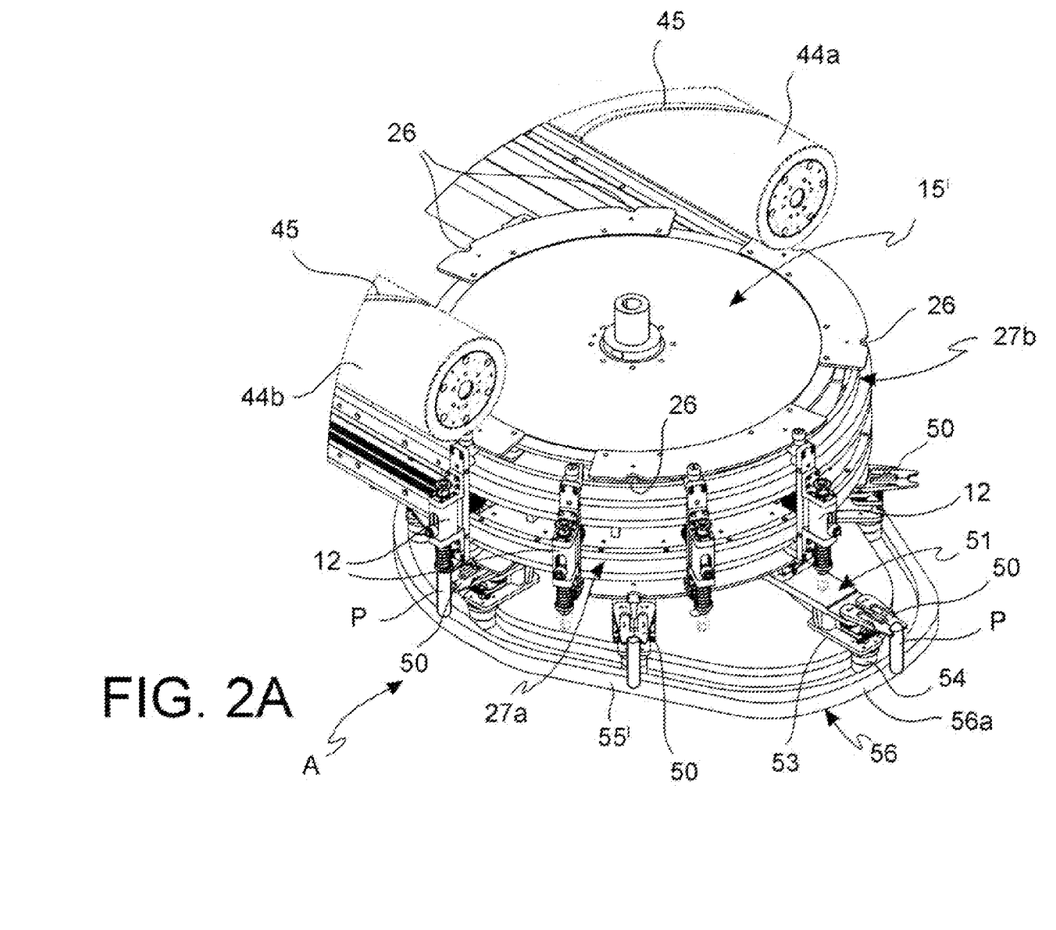
FIG. 2A represents a detailed view of the system of FIG. 2, according to a different embodiment.

In other embodiments, as shown in FIGS. 2A and 8, the cam profile 55' may have at least one intermediate length with radius of curvature lower than that of the driving wheel 15', so as to form a protruding portion 56 in a radial direction with respect to the driving wheel 15'. Such protruding portion 56 may include a point of maximum extent 56a that corresponds with the position of maximum extent of the plier 50 and which is generally at the intermediate point of the path.

The operation of systems for spacing and transferring objects according to embodiments of the invention is described below in the context of use with ovens.

The preforms may be fed to an oven 1 by a distribution star 2 as shown in FIG. 1. At the feeding point, or in an upstream position, the mandrels 12, pushed by the first screw 44a and mobile in procession along the track 11 in contact with each other, may interfere, through the driven member 40 thereof, with a suitable cam profile. In this manner, the gripping finger 37 may be raised from the cam, then subsequently lowered, by virtue of the return by the spring 42, so as to insert in the neck of the preform P and to engage therewith. From this moment, each mandrel 12 may carry a preform that is held in suspension.

Subsequently, the mandrels 12 with the preforms may pass through various heating modules 10 of the first rectilinear length 13 and, being pushed by the first screw 44a, they may be driven by the driving wheel 15 passing to the second rectilinear length 13' of the track 11, where the preforms are further heated by other heating modules 10, until reaching the proper softening temperature of the material.

A this point, the mandrels 12 with the softened preforms, when they have reached the second screw 44b, may interfere with the corresponding groove 45 through the pushing roller 36. Since the groove 45 has a variable increasing pitch, the mandrels 12, which come in contact with one another, may be spaced by a larger pitch that corresponds with the pitch of the notches 26 of the driving wheel 15'. Such pitch may be equal to or lower than that of the notches 4 of the distribution star 3.

At the point A shown in FIG. 2A, a mandrel 12, carrying a preform P, may be at plier 50, which allows for coupling to the preform P. The second cam profile 67 with which the second driven member 54' of the plier 50 cooperates, causes a lowering of the plier just downstream of point A, so as to disengage preform P from the gripping finger 37 of the mandrel 12.

Subsequently, the plier 50 carrying the preform P, moving integrally with the driving wheel 15', may follow the path dictated by the first cam profile 55, 55', up to the point (not shown) in which the preform P is passed by the plier 50 to the distribution star 3. This point usually will be located at an intermediate point along the path of the plier.

The path dictated by the cam profile 55, 55', as stated, may vary according to specific needs. In particular, in the embodiment shown in FIG. 2A, the cam profile 55' carries the plier 50 up to point 56a in which the transfer of the preform P from the plier 50 to the distribution star occurs.

In this manner, a transfer of the preform P may be carried out in homokinetic conditions. In particular, the preform P may be subjected to a first linear acceleration upon the spacing carried out by the screw 44b, and a second radial acceleration at the extension thereof, carried out by the plier 50 up to the transferring point 56a. Consequently, the two components of acceleration are divided into separate steps and occur gradually.

These operative conditions reduce the mechanical stress that softened preforms P must undergo, thus preventing deformation.

The mandrels 12 without preforms and spaced at the larger pitch then may be driven by the driving wheel 15' up to the first screw 44a. The latter, having a groove 45 with a decreasing pitch in the running direction of the mandrels 12, brings them back to the condition of minimum pitch, and pushes them along the track 11 to be in contact with one another.

Figure 9:
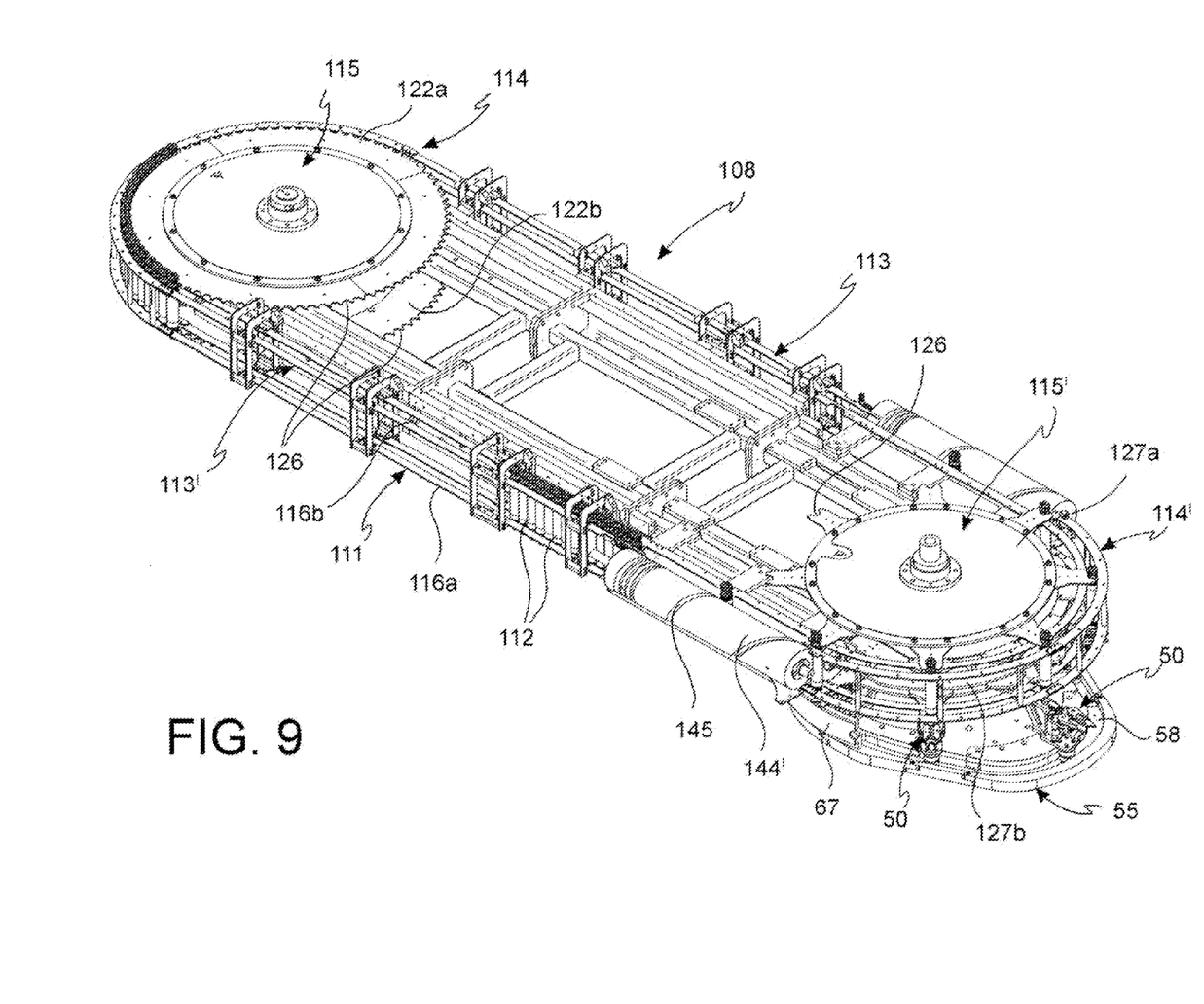
FIG. 9 shows a perspective view of a different embodiment of the system for spacing and transferring objects according to an embodiment the invention.
Figure 10:
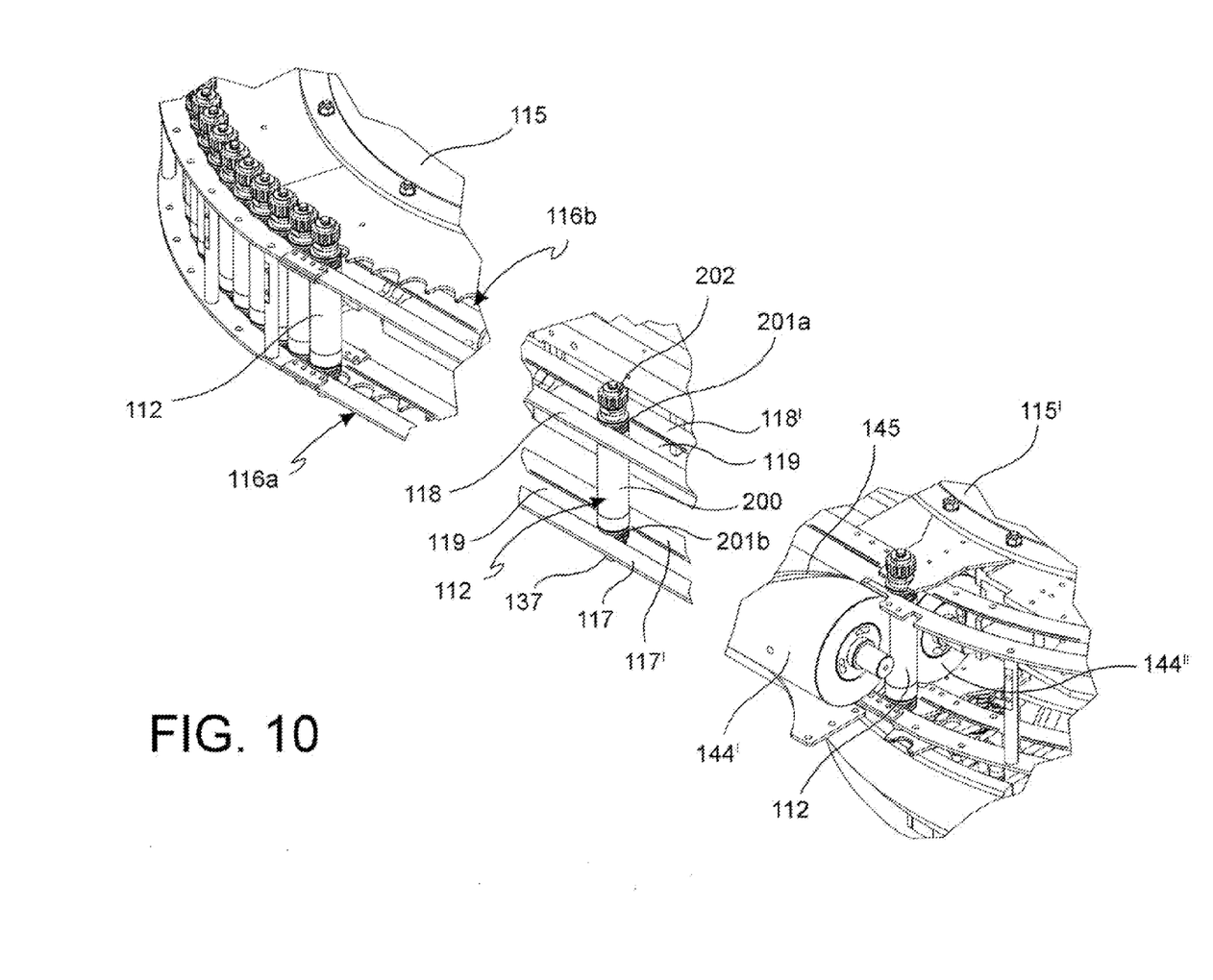
FIG. 10 shows a detailed perspective view of the embodiment of FIG. 9.
Figure 11:
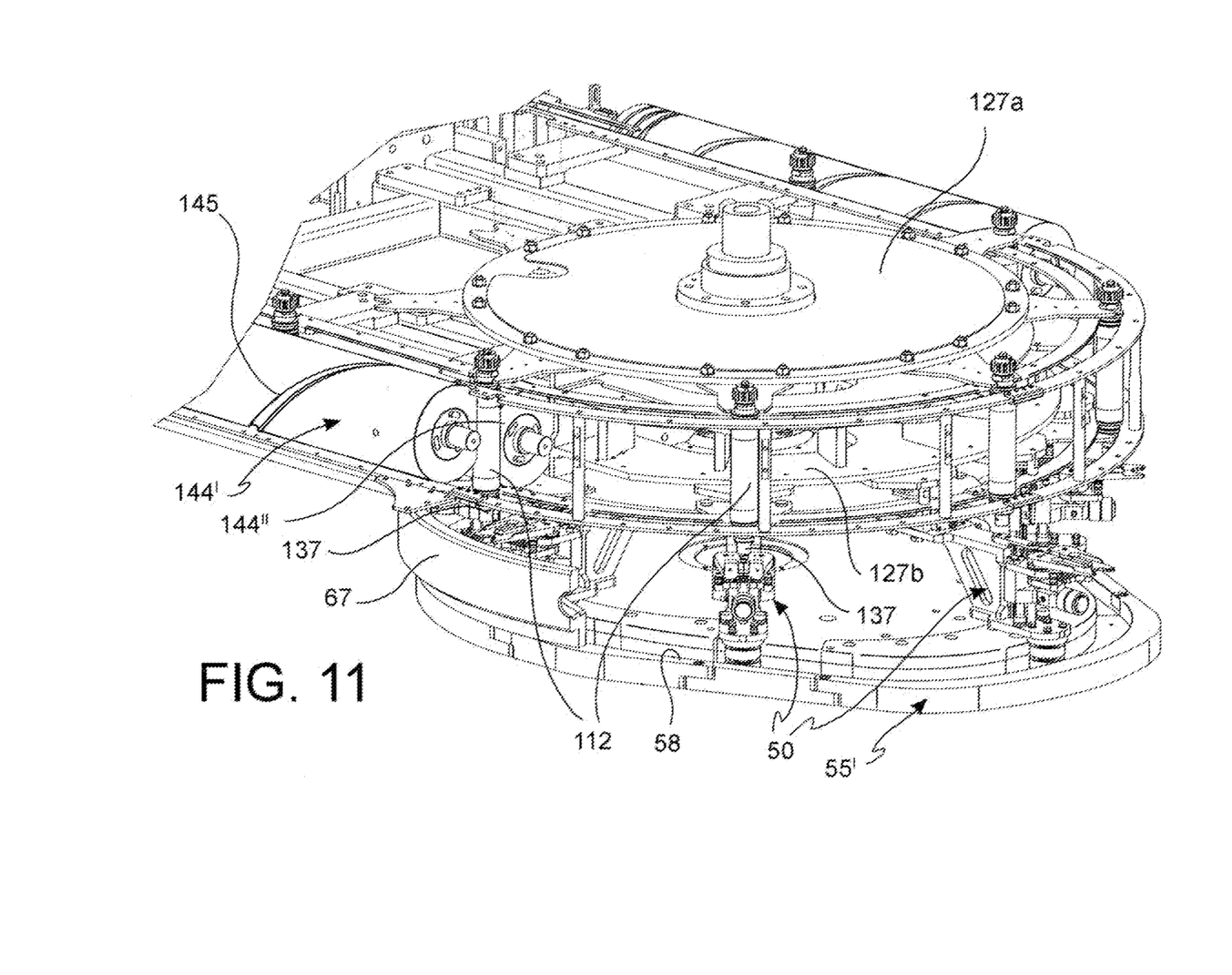
FIG. 11 shows a perspective view of different details of the embodiment of FIG. 9.

In FIGS. 9-11, additional embodiments of the system for spacing and transferring objects are shown.

In certain embodiments, systems of the invention may include transport elements 108. Transport elements 108 may include a track 111 on which a plurality of mandrels 112 runs, each being adapted for engaging an object, such as a preform. The track 111 may include two substantially parallel rectilinear lengths 113, 113' and two curvilinear lengths 114, 114' connecting at the two ends the rectilinear lengths 113, 113' according to an arc-of-circle-shaped path. Corresponding driving wheels 115, 115' may be arranged at said curvilinear lengths 114, 114', as described in more detail below.

The track 111 may include a pair of vertically aligned rails 116a, 116b, each in turn being divided into rectilinear lengths and curvilinear lengths at the rectilinear and curvilinear lengths 113, 113', 114, 114' of track 111.

Each rail 116a, 116b may be formed by a pair of profiles 117, 117', 118, 118' arranged side-by-side and separated by a gap 119.

The first driving wheel 115 may be arranged in a distal position with respect to the feeding point of the objects in the system, while the second driving wheel 115' may be arranged at the output point of the objects and in a position proximal to the feeding point of the objects in the system.

The driving wheels 115, 115' may include an upper disc 122a, 127a and a lower disc 122b, 127b, arranged respectively in a lower and upper position with respect to the rails 116a, 116b and within the curvilinear length 114 of the track 111.

The upper 122a, 127a and lower 122b, 127b discs may be associated with corresponding vertical shafts 123 freely rotatable on a suitable support (not shown). Both the lower disc 122b, 127b and the upper disc 122a, 127a of the first and the second driving wheels 115, 115' may include along the perimeter thereof a plurality of semicircular recesses 126 arranged in sequence, so that the recesses 126 in the two overlapping discs are aligned. However, in the second driving wheel 115', the semicircular recesses 126 may be arranged at an angular distance one to the other that is larger and to the pitch of the gripping elements 3 of the handling elements 4.

Each of the mandrels 112 may include a cylindrical body 200, at the two ends of which, an upper flange member 201a and a lower flange member 201b are arranged. Each flange member 201a, 201b may define a circular groove which cooperates with the pair of upper profiles 117, 117' and with the pair of lower profiles 118, 118', respectively. To this aim, the length of the cylindrical body 200 of the mandrel 112 may correspond to the distance between the lower rail 116a and the upper rail 116b, while the diameter of the circular groove may substantially correspond to the gap 119. In this manner, the mandrel 112 may be longitudinally held, and inclination thereof in each direction is prevented. At the same time, the mandrel 112 is free to rotate idle. At the upper end of the mandrel 112, a toothed roller 202 may be secured, which interacts with suitable racks within the oven, so as to rotate and subsequently allow an even distribution of heat throughout the preform surface. In systems for spacing and transferring which are not applied to a preform oven, this member may be omitted.

The lower end of the mandrel 112 may include a gripping finger 137, similar to that described above with reference to certain embodiments. The gripping finger 137 may be, for example, adapted to interfere with the neck of a preform, but may be replaced in other applications by suitable engaging elements.

The transport elements 108 may further include handling and spacing system of the mandrels 112. Such handling and spacing system may include at least one pair of screws 144', 144" arranged at a junction point between the second rectilinear length 113' of the track 111 and the driving wheel 115'.

The two screws 144', 144" may be arranged side-by-side, but arranged on planes that are offset in height, so that the higher screw interacts with the cylindrical body 200 of the mandrel 112 below the pair of profiles 118, 118', while the lower screw interacts with the same cylindrical body 200 of the mandrel 112 above the pair of profiles 117, 117', so that, during acceleration the mandrel 112 may be stabilized in all directions due to the action of the combined constraint of the screws and of a portion of the guide 118 and 117. For this purpose, the distance between the reactive surfaces of the two screws 144', 144" substantially corresponds to the diameter of said flange members 201a, 201b of the mandrel 112.

Both screws 144', 144" may include a spiral slot 145 with variable pitch which creates a reactive surface on the screw.

Both screws 144', 144" may have the larger pitch downstream along the direction of movement of the preforms.

The screws 144', 144" may be moved independently, but in a synchronized manner by corresponding motors (not shown), or by a single motor provided with a mechanical transmission.

A second pair of screws may be present at the feeding point of objects in the transport element 108, i.e., between the driving wheel 115' and the first rectilinear length 113.

A plurality of pliers 50 may be associated with the driving wheel 115', which pliers may be mobile along a cam profile 55, 55' similar to that described with reference to the previously described embodiments, to which further reference is made.

Although the above-described embodiments of the invention have been provided for handling, spacing and transferring of preforms heated within an oven, such as an infrared oven for preforms, it should be apparent that systems for spacing and transferring objects may be applied to other equipment for handling objects and for distancing them at a preset pitch, particularly in the packaging field.

In sum, the present invention relates to various systems for spacing and transferring of objects advancing in procession at a minimum pitch on transport elements 8, 108, for the spacing said objects from said minimum pitch to a preset pitch that is larger than said minimum pitch and for transferring said spaced objects to handling elements 3, in which such systems may include a driving wheel 15', 115', said driving wheel 15', 115' having a plurality of recesses 26, 126 for driving said objects, the recesses 26, 126 being spaced by a pitch larger than said minimum pitch of the objects in the transport elements 8, 108, said pitch of the recesses 26, 126 being equal to or less than said preset pitch, wherein such systems may further include:

handling and spacing system 44b, 144', 144" of the objects from said minimum pitch to a pitch corresponding substantially to the pitch of the recesses 26, 126 and a plurality of pliers 50 for objects radially extendible from the driving wheel 15', 115', said pliers 50 being driven by a cam profile 55, 55' that determines the path of said pliers 50, said pliers 50 being adapted to transfer the objects to said handling elements 3.

The present invention also provides various methods for spacing objects advancing in procession on transport elements 8, 108 from a minimum pitch to a preset pitch that is larger than the minimum pitch and for transferring said spaced objects to handling elements 3, comprising:

a linear spacing step along said transport elements 8, 108, in which an object is subjected to gradual linear acceleration, a radial spacing step along said transport elements 8, 108 between a first circumference and a second circumference having a radius higher than or equal to the radius of said first circumference, in which said object is subjected to gradual radial acceleration, a transferring step from said transport elements 8, 108 to said handling elements 3 in which said transferring occurs in homokinetic conditions.

The terms "gradual linear acceleration" or "gradual radial acceleration" generally refer to a non-instantaneous linear or radial acceleration, i.e. that which occurs in a time lapse sufficiently long so as not to cause dynamic stress to a transported object.

In certain embodiments, the handling elements 3 may include a distribution star and the objects may include preforms or containers.

The advantages of the present invention are many.

For example, the described systems increase the efficiency of the transport elements and reduces overall dimensions, since the mandrels proceed in contact with one another, thus at a minimum possible distance. When applied to a preform oven, heat dispersion is reduced and energy efficiency is maximized.

Furthermore, in certain embodiments the mandrels 12 are not directly connected to transport elements, but are pushed by two screws 44a, 44b. This provides considerable simplification of the machine and significant savings in cost and maintenance times.

In addition, guide systems that include toothed wheels 31, 31' engaging on the double rack bars 17a, 17b, as well as the guide rollers 34, 35 adapted for engaging with the recesses 26 of the driving wheels 15, 15', provides efficient control of the mandrels 12 position, throughout the path, with respect to longitudinal or transversal oscillations thereabout of the same mandrel.

The bearings 32a, 32b sliding on the corresponding guide bars 18a, 18b also serve to maintain the proper position of the mandrels 12.

Because the cam profile 55, 55' is interchangeable, it allows homokinetic transfer as described above, independent from the pitch, the dimension, or the rotation speed of the distribution star which receives and transfers objects, such as heated preforms.

This avoids deformation of the preforms that, as stated above, has undesirable effects on the final result of the blowing operations.

Advantages of homokinetic transfer of objects and the spacing thereof in the absence of accelerative stresses, by separating the linear acceleration from the radial acceleration, and by allowing gradual acceleration, is a further important advantage of systems according to the present invention.

A person skilled in the art based on the instant disclosure may make certain modifications which would still fall under the literal scope of the appended claims or their equivalents.

For example, in certain embodiments, the bearings 32a, 32b and the corresponding guide bars 18a, 18b can be eliminated, without noticeably compromising the stability of the mandrels 12.

The invention claimed is:

1. A system for spacing and transferring objects advancing in procession on transport elements from a minimum pitch to a preset pitch larger than said minimum pitch, and for transferring said spaced objects to handling elements, said system comprising a driving wheel, said driving wheel comprising a plurality of recesses for driving said objects, the recesses being spaced by a pitch larger than said minimum pitch of the objects in the transport elements, said pitch of the recesses being equal to or less than said preset pitch, wherein said system further comprises:
a handling and spacing system capable of moving said objects from said minimum pitch to a pitch substantially corresponding to the pitch of the recesses, and
a plurality of pliers radially extendible from the driving wheel, said pliers being driven by a cam profile that determines the path of said pliers, said pliers being adapted to transfer the objects to said handling elements.

2. The system of claim 1, wherein said objects are preforms transported by mandrels, and wherein said transport elements are located in an oven for heating and treating a thermal profile of preforms.

3. The system of claim 1, wherein the pliers are arranged below the driving wheel and are mounted on slide elements allowing the plier to radially extend with respect to the driving wheel.

4. The system of claim 3, wherein the system comprises a guide structure comprising a hub, mounted below the driving wheel so as to rotate integrally thereto, from which a plurality of guide bars radiates; and wherein the slide elements comprise a sliding portion and a support portion, the sliding portion comprising a closed C-shaped profile member adapted to slide along one of said guide bars.

5. The system of claim 4, wherein the support portion comprises a driven member.

6. The system of claim 5, wherein said driven member comprises a driven roller which is freely rotatable with a vertical rotational axis.

7. The system of claim 3, wherein said pliers are vertically mobile with respect to said slide elements.

8. The system of claim 7, wherein the plier is associated with a sliding member in a vertical guide secured to the support portion, so that the plier can slide vertically abutting against elastic compression elements.

9. The system of claim 7, wherein the plier comprises a second driven member protruding outwardly from the plier in a longitudinal direction.

10. The system of claim 9, wherein the second driven member is a single or a double driven roller freely rotatable with a horizontal rotational axis.

11. The system of claim 1, wherein a first cam profile is located in a fixed, yet removable, manner below the second driving wheel, said first cam profile being adapted to cooperate with the first driven member of the pliers.

12. The system of claim 7, wherein said first cam profile comprises a curvilinear path running at a lower level than the level in which the first driven member is located at the gripping point of an object by the plier.

13. The system of claim 1, wherein the cam profile is interchangeable.

14. The system of claim 1, wherein the first cam profile describes an arc-of-a-circle with the same radius of curvature as the driving wheel.

15. The system of claim 1, wherein the first cam profile has at least one intermediate length with a radius of curvature less than that of the driving wheel, so as to form a protruded portion in the radial direction with respect to the driving wheel, said protruding portion comprising a point of maximum extent corresponding to the position of maximum extent of the plier at the transferring point of the object from the oven to the handling elements.

16. The system of claim 1, comprising a second cam profile located at a gripping point of an object by a plier, said second cam profile being adapted for cooperating with the second driven member of the plier.

17. The system of claim 16, wherein the second cam profile comprises an initial raised length and a terminal lowered length, so as to lower the plier to such a level that the first driven member cooperates with the curvilinear path of the first cam profile.

18. The system of claim 1, wherein said transport elements comprise a track on which a plurality of mandrels runs, each being adapted to engage an object.

19. The system of claim 18, wherein the track comprises a pair of rails arranged one above the other, wherein the rails comprise rack bars facing one another.

20. The system of claim 19, wherein the rails have an L-shaped profile in section, wherein said rack bars form a side of the L, and guide bars forming the other side of the L, wherein the guide bars extend in opposite directions on a same vertical plane.

21. The system of claim 1, wherein said driving wheel comprises a pair of lower discs and a pair of upper discs, said pair of discs being arranged in a lower and upper position, respectively, with respect to rails and within a curvilinear length of the track.

22. The system of claim 1, wherein each of the mandrels comprises a housing associated with a sliding support, the sliding support comprising a fork bar with a C-shaped profile astride the track, and the mandrel comprises two toothed wheels, arranged along a vertical axis between the rack bars of rails, so as to mesh with one another and with the racks of the corresponding bars.

23. The system of claim 22, wherein each of the toothed wheels comprises two coaxial toothed pinions, arranged so as to mesh with the double racks that are present on the rectilinear lengths of the rails.

24. The system of claim 23, wherein the sliding support comprises guide elements of the mandrel adapted to engage with the recesses of the driving wheels.

25. The system of claim 15, wherein a pushing roller is rotatably mounted on the mandrel, the pushing roller being adapted for cooperating with said handling and spacing system.

26. The system of claim 25, wherein the handling and spacing system comprises a screw which screw comprises a spiral slot with variable pitch, for interfering with the pushing roller of each mandrel, said screw being mounted so as to have the larger pitch downstream.

27. The system of claim 1, wherein the transport elements comprise a track on which a plurality of mandrels runs, each being adapted to engage an object, wherein the track comprises two substantially parallel rectilinear lengths and two curvilinear lengths connecting at the two ends the rectilinear lengths according to an arc-of-circle-shaped path, corresponding driving wheels being arranged at said curvilinear lengths.

28. The system of claim 27, wherein the track comprises a pair of vertically aligned rails, each in turn being divided into rectilinear lengths and curvilinear lengths at the rectilinear and curvilinear lengths of the track, each rail being formed by a pair of profiles that are arranged side-by-side and separated by a gap.

29. The system of claim 27, wherein the driving wheel comprises an upper disc and a lower disc, arranged in a lower position and an upper position respectively, with respect to the rails and within the curvilinear length of the track.

30. The system of claim 27, wherein each of the mandrels comprises a cylindrical body, at the two ends of which an upper flange member and a lower flange member are arranged, wherein each flange member defines a circular groove for cooperating with the pair of lower profiles and with the pair of upper profiles, respectively, the diameter of the circular groove substantially corresponding to the gap; the lower end of the mandrel further comprising a gripping finger.

31. The system of claim 27, wherein said handling and spacing system of the objects comprise a pair of screws arranged at the junction point between the second rectilinear length of the track and the driving wheel, the screws comprising a spiral slot having a variable pitch comprising the reactive surface of the screw having the larger pitch downstream along the running direction; wherein said screws are arranged side-by-side, but on planes that are offset in height, so that the higher screw interacts with the cylindrical body of the mandrel below the pair of upper profiles, while the lower screw interacts with the same cylindrical body above the pair of lower profiles.

32. A machine comprising the spacing and transferring system of claim 1, said machine comprising an oven for the heating and treating of the thermal profile of preforms, a blowing or stretch-blowing machine, comprising a plurality of moulds, and handling elements of the preforms entering and exiting said oven, wherein said oven comprises said transport elements for the preforms comprising a plurality of mandrels and heating elements of the preforms, and wherein said handling elements for the preforms exiting the oven comprise a plurality of gripping elements for the preforms spaced by said preset pitch, wherein said driving wheel is arranged at the release point of the preforms exiting the oven.

* * * * *